United States Patent Office 3,252,785
Patented May 24, 1966

3,252,785
FERTILIZER PROCESS
Frank D. Hoblit, Atlanta, Ill., assignor to Diamond Alkali Company, a corporation of Delaware
No Drawing. Filed Mar. 5, 1964, Ser. No. 349,772
7 Claims. (Cl. 71—23)

This is a continuation-in-part of my application, Serial No. 120,182, filed June 28, 1961 and now abandoned.

This invention relates to commercial fertilizers and pesticides and, especially, to fertilizer and pesticide products which are adapted to application to lawns.

Commercial fertilizers were originally conceived as agricultural products and since handling and spreading was to be done by power operated equipment alone or in conjunction with the efforts of men accustomed to heavy physical work, the gross weight per unit volume of the product was not an important consideration. Accordingly, fertilizers were formulated using crushed limestone, phosphate rock, or sand as a carrier for other plant nutrients. The first lawn fertilizers also followed this general scheme of formulation.

In recognition of the expanding role of the housewife as a purchaser and as a moving force in all aspects of home activity, modern lawn fertilizers have been manufactured as comparatively high analysis products adapted for gradual release of the plant nutrients and formulated on carrier materials having a high bulk/weight ratio. When so provided, lawn fertilizer is amenable to purchase, handling and personal use by the housewife without requiring strenuous exertion on her part.

Light weight lawn fertilizers have heretofore employed exfoliated vermiculite as the carrier material, although the mineral nature and other inherent characteristics of this product have given rise to certain problems. While exfoliated vermiculite is highly porous, it has been discovered that plant nutrient liquors are only absorbed at or near the surface of particles of this material and, because of the lack of deep penetration, the total amount of nutrients that a given particle can carry is sharply restricted. Moreover, those nutrients which are absorbed are released more readily than if they were deeply absorbed.

Exfoliated vermiculite has also been found to be difficult to color uniformly and it is believed that this difficulty is related both to the micacious mineral character of the product and to the interlaminar nature of the pores. Also the wide ranges of particles size and density of vermiculite present problems of segregation during manufacturing and shipping.

In addition, particles of exfoliated vermiculite are brittle, abrasive and compressible. Because of the brittle nature of the particles, they are easily crushed on rough handling restricting the absorbency if blows are inflicted prior to processing into lawn fertilizer leading to the appearance of short-weight packages if crushing occurs after processing. The abrasive character of particles of exfoliated vermiculite tends to incur self-grinding with the resultant development of excessive fines; the abrasive character further having a deleterious effect on processing equipment.

It is, therefore, an object of this invention to provide new and improved fertilizer and pesticide products of the light weight type.

Another object of the invention is to provide a product having a uniform attractive color.

Another object of the invention is to provide a product employing a carrier which promotes gradual solubilization of plant nutrients.

Another object of the invention is to provide a product comprising soft, tough, relatively incompressible granules.

A further object of the invention is to provide a product that is highly amenable to modern merchandising methods.

A still further object of the invention is to provide a product incorporating a humus-forming carrier.

Another object of the invention is to provide a granularly stable product.

A yet further object of the invention is to provide a product which is susceptible of formulation in a wide variety of chemical analyses.

Additional objects and features of the invention pertain to the particular materials and methods whereby the above objects are attained.

The objects of this invention have been found to be met by formulating fertilizer and pesticide products to comprise plant nutrient materials absorbed on a particulate cellulosic carrier and, in a preferred embodiment of the invention, ground corn cobs are employed for the carrier material. Products manufactured in compliance with the invention exhibit a high bulk to weight ratio and are readily provided with a uniform attractive color. In addition, the specific type of carrier utilized in the product of the invention has been found to be highly absorbent of plant nutrient liquors resulting in deep penetration thereof into the carrier products, thus promoting a gradual release of the nutrients in use. Because of its organic nature, the carrier material of the invention is subject to decay upon application to the soil whereby to break down forming humus.

The term "carrier" as used herein refers to a material which is capable of absorbing plant nutrient liquors, which is capable of retaining the plant nutrients when subjected to the mild heat and moving air currents used to drive out excessive moisture as well as being capable of retaining pesticidal materials and which releases the nutrients and pesticides on being exposed to the elements and to the conditions of the end-use environment.

The carrier of the invention is itself comparatively water insoluble and is relatively chemically inert, entering into no reactions with the plant nutrients or pesticides. As has been described hereinabove, the carrier of the invention is selected to be of organic, vegetable origin comprising appreciable quantities of cellulose. It is thus susceptible of biochemical decomposition adding humus to the soil in conjunction with the plant nutrient amendments.

The term "pesticide" as used herein refers to materials which will combat, control or destroy pests which are injurious to lawns or which mar the beauty of lawns. The term includes, but is not limited to, herbicides, fungicides and insecticides.

Spreading of lawn fertilizer and pesticides has been found to be greatly facilitated by providing the product as particles or granules. Accordingly, the starting material for the carrier of the invention is desirably ground or comminuted to achieve a particulate form. Sawdust, other particulate materials derived from the stems of woody plants, and ground nutshells, particularly ground pecan shells, have been usefully employed for the carrier of the invention. However, ground corn cobs are preferred because of their softness, toughness and generally better colorability. As used herein, the term "corn cobs" refers to the rachis of the lateral inflorescence of Zee maize.

Ground corn cobs have been found to be an excellent carrier for the fertilizer and pesticide products of the present invention because, in addition to being highly absorbent and capable of being decomposed by weather and bacteria in the soil, the granular corn cob will absorb its own weight in nutrient solution and still retain the same bulk density due to expansion of the particles.

The nutrient materials contemplated for use in the fertilizer product of this invention are those which are primarily required for plant growth, specifically, nitrogen, phosphorus and potassium. The inclusion of other plant nutrients such as iron, zinc and calcium is also contemplated when desired. Advantageously the instant fertilizer product contains relatively high proportions of the primary plant nutrients in forms available to plants. This being done in order to achieve immediate plant responses upon application of the fertilzer product plus prolonged feeding so as to render frequently repeated applications unnecessary.

Because the plant nutrients are intended to be applied to the carrier material in liquid form, nitrogen is desirably provided as a water solution of either ammonia or urea, or both. Similarly, the phosphorus is supplied in the form of phosphoric acid. Potassium may be supplied in the form of its soluble salts, for example, potassium sulfate or potassium chloride.

So that the finished product will be appealing to the eye and will be easily discernible when applied to the lawn, a coloring agent is desirably incorporated and numerous dyes and pigments have been successfully employed in this regard. Such mineral pigments as yellow ochre, mineral black and red iron oxide have proved to be useful. In addition, a variety of dyes have been included to advantage. Water-soluble dyes such as auramine yellow and those of the tropaeolin type, for example, metanil yellow, are valuable for the purpose. Similarly useful are Pontacyl Black, Pontacyl Green NB, Orange RO and Wood Stain Scarlet NS, available commercially from E. I. du Pont de Nemours & Company, Wilmington, Delaware.

The corn cob is ground and screened to obtain particles of substantially uniform size. As the carrier for the fertilizer products of the present invention, it is preferred that the particles be of such size that they will pass through a No. 12 sieve and be retained on a No. 30 sieve. The sieves are designated in accordance with U.S. Sieve Series, i.e., a No. 12 sieve has openings measuring 0.0661 inch and a No. 30 sieve has openings measuring 0.0232 inch. It is further preferred that approximately 25 percent, by weight of the particles, be of a size such that they will pass through a No. 20 sieve with about 75 percent of the particles being of a size to be retained on a no. 20 sieve. Cobs of this size are identified in the trade as No. 3 or as 12–30 cobs. This distribution of particle size is necessary to assure that all of the liquids will be absorbed, particularly liquids containing the higher percentages of nutrients. Corn cob particles identified as 30–60 cobs, i.e., those which pass through a No. 30 sieve and be retained on a No. 60 sieve are used for the pesticide products in order to provide more uniform coverage and more particles per unit of area.

In accordance with the invention, lawn fertilizer products are prepared by mixing the nutrients to form a solution, the coloring agent being conveniently dissolved or dispersed in this solution. Thereafter, the mixture is sprayed onto the particulate carrier in a rotary mixer and, as will be recognized, the potassic ingredient may be mixed in a dry state with the particulate carrier or it may be dissolved in the nutrient liquor.

Fertilizers are commonly designated by the respective percentages of nitrogen, phosphate and potash contained therein. The nitrogen content is shown as the percent by weight of nitrogen in the product. The phosphate content is the percent by weight of $P_2O_5$ contained in the product and the potash content is reported as the percent by weight of $K_2O$. Thus, a fertilizer identified as 10–5–5 contains 10 percent by weight of nitrogen, 5 percent by weight of phosphate as $P_2O_5$ and 5 percent by weight of potash as $K_2O$.

There are four general classes of fertilizer materials containing fixed nitrogen, (1) nitrates, (2) ammonium salts, (3) natural organics, and (4) synthetic organic chemicals. Nitrates are the salts of nitric acid which may be formed by the reaction of nitric acid on metals and alkalis. Ammonium salts include such materials as ammonium chloride, ammonium nitrate, ammonium phosphate, ammonium sulfate and mixed ammonium salts such as ammonium prosphate potash, ammonium phosphate sulfate and the like. Natural organics are by-products obtained from processing of animal or vegetable substances and include dried blood, cottonseed meal, tankage, bonemeal, tobacco stems and many similar substances. Examples of synthetic organic chemicals which are produced for use as fertilizers are calcium cyanamid, urea and ureaform. Also employed in the production of fertilizers are aqueous solutions of nitrogenous fertilizer chemicals which are known as nitrogen solutions or ammoniating solutions. Such solutions may contain ammonia and ammonium nitrate, ammonia and urea, or ammonium, ammonium nitrate and urea. Some of the solutions also contain formaldehyde.

The preferred nitrogen-source materials which are employed in the present invention are ammoniating solution, urea, and ureaform. A typical ammoniating solution is produced by Allied Chemical Company and is identified as U.A.S.A. This solution contains 45.4 percent total nitrogen, 36.8 percent ammonia, 32.5 percent urea and 30.7 percent water. Ureaform is a name used to designate a class of synthetic insoluble nitrogenous materials, methylene ureas, made by reaction of urea and formaldehyde in a form available to plants. Because of its low solubility, nitrogen is slowly available over a long period of time and ureaform cannot burn vegetation or interfere with germination. Urea contains 46 percent nitrogen and, as used, is in the form of pellets or prills.

The presently preferred source of phosphate is liquid phosphoric acid which may contain up to 63.75 percent $P_2O_5$. Potassium salts of inorganic acids and preferably potassium chloride are used as the source of potash. The phosphoric acid is reacted with ammonia to form a nutrient solution and the potassium salt may be added to the reactor where it is dissolved in the nutrient solution or it may be combined with the other dry ingredients.

According to the present invention, the liquid ingredients and urea are reacted in an open agitated reactor which is fitted with a horizontal pipe sparger for introduction of the ammoniating solution. The sparger is placed near the bottom of the reactor vessel and, typically, may be provided with ten $\frac{1}{16}$-inch diameter holes. All of the ingredients are metered into the reactor so that the proportions may be accurately controlled.

Enough water is placed in the reactor to cover the sparger and phosphoric acid is then metered in. Ammoniating solution is slowly introduced and allowed to react with the phosphoric acid. Urea prills are fed into the reactor from a hopper by means of a suitable V-control. The reaction temperature is controlled by the rate of feed of the urea and is maintained above 150° F. and below 220° F., but preferably in the neighborhood of 180° to 200° F.. At a temperature of 150° F. the reaction mixture will solidify, while at temperatures above 200° F. undesirable phosphates are formed and at about 220° F. and above, air and steam will become trapped in the reaction mixture causing it to expand. In cold weather small amounts of sulfuric acid and enough additional ammoniating solution to neutralize the acid may be added to generate additional heat to maintain the desired reaction temperature.

The pH of the resulting nutrient solution is controlled by the ratio of ammoniating solutions to phosphoric acid and may be varied to suit the end product. Most of the fertilizer products of this invention have a pH in the range of 6.8 to 7, with the exception being products which are formulated to supply nutrient materials to acid-loving plants such as evergreens and have a pH in the range of 5.4 to 5.6. Material in the reactor is constantly agitated to provide better contact between the ingredients and prevent settling of any crystals that may form. After the reaction is completed, a dye substance may be added if it is desired to provide a uniform color to the granule.

The reaction step has been found to be essential in order to produce a uniform product. The reaction step also permits close and accurate control of the pH of the nutrient solution which, in turn, assures that all of the product granules will have the same pH. In contrast, previous practice has been to mix all of the ingredients, both soluble and insoluble together, and attempt to achieve a uniform product. It is impossible for all of the granules, even those produced in the same batch, to have the same pH and be of uniform consistency using previously known methods.

All of the dry ingredients, e.g., cobs, ureaform and potash, preferably as potassium chloride, are weighed into a mixer. As soon as the dry ingredients are thoroughly blended, the solution or slurry from the reaction vessel is introduced through the sparger pipe onto the tumbling dry mixture. Some of the nutrient solution is absorbed into the cob granules and the balance of the solution forms a coating on the granules, binding the other dry ingredients to the cob granule such that all of the solution is taken up by the cob granule either by absorption or adsorption.

The granular material is discharged from the mixer into a hopper which feeds material into a dryer. The dryer preferably is a conventional type rotary dryer wherein the excess moisture is removed from the granular material. After drying, the material is screened to remove oversize and undersize material. The oversize material is crushed and recycled through the dryer, while the undersized material is returned to the mixer to be moistened and formed into on-size granules or pellets. On-size material proceeds to curing or storage bins. If a heat sensitive pesticide is to be added to the granular material, the granules are transferred from the curing bin to a mixer where a solution of the pesticide is sprayed onto the granules. If the pesticide is not sensitive to heat such as may be encountered in the dryer, it may be added in the form of a wettable powder or the like into the reactor after the reaction is completed. The final operation is weighing the granular material into packages.

The resultant product is free-flowing and non-hygroscopic and the plant nutrients are physically absorbed by the carrier, substantially completely penetrating each particle of the carrier. Essentially no chemical reaction takes place between the carrier and either the plant nutrient materials, pesticide or the coloring agent, thereby allowing the fertilizer and pesticide products of the invention to be formulated in a wide variety of chemical analyses.

The fertilizer product of the invention is easily applied to the soil by the spreader devices which are generally available for such purpose and when the fertilizer product of the invention is applied to the soil the nutrients are gradually released by the leaching action of rain and irrigation waters and, upon decomposition of the cellulosic carrier. As will be recognized, the size of the carrier particle is regulated according to the size of the discharge openings customarily provided in commercially available spreader devices.

Because of the character of the carrier employed, the particles of the lawn fertilizer and pesticide products of the invention are tough, hard to compress and non-friable. Therefore, the products of the invention are resistant to self-grinding in the bagged state thus insuring a more uniform particle size such as to result in a more uniform spreadability. While the products of the invention have been referred to as lawn fertilizers and pesticides, they have also been found to be useful as garden and houseplant fertilizers and pesticides.

In order that those skilled in the art may more completely understand the present invention and the preferred methods by which the same may be carried into effect, the following specific examples are offered.

Example 1

Enough water is introduced into an open, agitated reactor vessel containing a sparger pipe near the bottom of the reactor to cover the sparger. The sparger pipe is fitted with ten $\frac{1}{16}$-inch diameter holes. Into the reactor is metered 380 pounds of phosphoric acid (54.3% $P_2O_5$) and 217 pounds of ammoniating solution (45.4% nitrogen) is slowly metered into the vessel to react with the phosphoric acid. As the temperature rises due to the exothermic nature of the reaction, 546 pounds of urea prills (46% nitrogen) are fed into the reactor in incremental amounts to maintain the temperature between 180° and 200° F. The material in the reactor is agitated constantly. After the reaction is completed, as indicated by a decrease in temperature, 2 pounds of metanil yellow dye is added to the reaction mixture. The pH of the resultant slurry is 6.8 to 7.

Into a mixer are weighed 472 pounds of No. 3 corn cobs, 165 pounds of ureaform (38.2% nitrogen) and 340 pounds of potassium chloride (61% as $K_2O$). As soon as these dry materials are thoroughly blended, the slurry from the reaction vessel is introduced through a sparger pipe onto the tumbling mixture. After the slurry has been sprayed on the dry material, the product is passed through a rotary dryer which is maintained at a temperature such that the temperature of the product at the exit end of the dryer is a maximum of 140° F. The dried product from which the excess moisture has been removed is then screened to remove undersize and oversize material. Oversize material is crushed and recycled through the dryer and again screened. Undersize material is returned to the mixer where it is redampened and formed into on-size pellets. The composition of this fertilizer product is 20 percent nitrogen, 10 percent phosphates as $P_2O_5$, and 10 percent potash as $K_2O$.

Example 2

Following the procedure of Example 1, 380 pounds of phosphoric acid, 217 pounds of ammoniating solution, and 696 pounds of urea are reacted and 2 pounds of metanil yellow dye is added. Six-hundred-eighty pounds of No. 3 cobs and 170 pounds of potassium chloride are mixed and then sprayed with the slurry from the reactor. The product which is then dried and screened contains 20 percent nitrogen, 10 percent phosphates as $P_2O_5$, and 5 percent potash as $K_2O$.

Example 3

A slurry is prepared, according to the procedure of Example 1, from 238 pounds phosphoric acid, 140 pounds ammoniating solution, 160 pounds urea, 250 pounds ammonium sulfate (20.5% nitrogen) and 2 pounds metanil yellow dye. This slurry is sprayed onto a mixture of 1050 pounds of No. 3 corn cobs, 140 pounds of potassium chloride and 55 pounds of ureaform. After drying and screening, the product is weighed into a mixer where 40 pounds of the N-oleyl-1,3-propylene diamine salt of 2,4-dichlorophenoxy acetic acid is applied as a fine spray. The product then proceeds to the packaging hopper without further treatment. This combination fertilizer and weed killer contains 10 percent nitrogen, 6 percent $P_2O_5$, 4 percent $K_2O$, and 1.23 percent 2,4-D.

Example 4

Following the procedure of Example 1, a nutrient solution or slurry is prepared using 231 pounds of phosphoric acid, 134 pounds of ammoniating solution, 202 pounds of urea and 2 pounds of metanil yellow dye. After the reaction between the acid and ammoniating solution is completed, 61 pounds of a commercially available wettable powder formulation containing 75 percent, by weight, of dimethyl tetrachloroterephthalate is added to the reaction vessel. The slurry from the reaction vessel is applied to a mixture of 1155 pounds of No. 3 cobs, 138 pounds of potassium chloride and 160.5 pounds of ureaform. After being dried and screened, the product is weighed into a mixer and 26 pounds of chlordane (1,2,4,5,6,7,8,8-octochloro-3a,4,7,7a-tetrahydro-4,7-methanoindane) is applied to the product as a fine spray. The product is then packaged. This combination of fertilizer, herbicide and insecticide contains 10 percent nitrogen, 6 percent $P_2O_5$, 4 percent $K_2O$, 2.1 percent dimethyl tetrachloroterephthalate, and 1.3 percent chlordane.

*Example 5*

Following the procedure of Example 4, a slurry is prepared containing 119 pounds of phosphoric acid, 73 pounds of ammoniating solution, 124 pounds of urea and 63.8 pounds of a wettable powder containing 75 percent, by weight, of dimethyl tetrachloroterephthalate. This slurry is then sprayed on 1742 pounds of No. 3 cobs while the cob particles are being agitated. The combination fertilizer and crabgrass killer contains 5 percent nitrogen, 3 percent $P_2O_5$ and 2.39 percent dimethyl tetrachloroterephthalate.

*Example 6*

A nutrient solution or slurry is prepared by the process of Example 1 employing 532 pounds of phosphoric acid, 264 pounds of ammoniating solution, 102 pounds of urea and 2 pounds of metanil yellow dye. The pH of this solution is kept in the range of 5.4 to 5.6. A uniform mixture is prepared containing 1050 pounds of No. 3 cobs, 210 pounds of potassium chloride, 3 pounds of chelated iron, 10 pounds of ferric sulfate, 16 pounds of copper sulfate and 24 pounds of aluminum sulfate. The nutrient solution is applied to the tumbling dry mixture. The product is then dried, screened for uniformity of size and packaged. The product contains 8 percent nitrogen, 14 percent $P_2O_5$ and 6 percent $K_2O$, as well as small amounts of trace elements and is particularly well suited as a plant food for evergreens and other acid-loving plants and shrubs.

*Example 7*

A herbicidal product which is effective against dandelion and other broad-leaved weeds is prepared by spraying, as a fine mist, 45 pounds of the N-oleyl-1,3-propylene diamine salt of 2,4-dichlorophenoxy acetic acid onto 1955 pounds of No. 30-60 cobs while the cobs are being agitated in a mixer. This product contains the equivalent of 19.44 pounds of 2,4-D acid per ton.

*Example 8*

A herbicidal product for control of weeds in lawns is prepared by thoroughly mixing 1845 pounds of No. 30-60 cobs and 40 pounds of the sodium salt of methanearsonic acid (DSMA). In a separate mixer 30 pounds of mineral seal oil, 55 pounds of 2(2,4,5-trichlorophenoxy)-propionic acid and 30 pounds of the N-oleyl-1,3-propylene diamine salt of 2,4-dichlorophenoxy acetic acid are mixed and this mixture is then sprayed onto the cob-DSMA mixture. The liquid serves as a sticking agent and causes the DSMA to adhere to the cob particles.

*Example 9*

A product for the control of insect pests in lawns is prepared by thoroughly mixing 1865 pounds of No. 30-60 cobs and 50 pounds of 1-naphthyl-N-methylcarbamate powder. A mixture of 50 pounds of mineral seal oil and 35 pounds chlordane (1,2,4,5,6,7,8,8-octochloro-3a,4,7,7a-tetrahydro-4,7-methanoindane) is sprayed onto the dry mixture. The liquid mixture causes the carbamate powder to adhere to the cobs, resulting in a uniform dustless product.

*Example 10*

A lawn fungicide is prepared by thoroughly mixing 1854 pounds of No. 30-60 cobs and 96 pounds of 2,4-dichloro-6-(o-chloroanilino)-s-triazine. This dry mixture is then sprayed with 50 pounds of mineral seal oil, which serves to bind the active material to the cob particles and eliminate dusting.

*Example 11*

A combination fertilizer and weed killer is prepared according to the procedure of Example 3. A nutrient solution is prepared containing 382 pounds of phosphoric acid, 60 pounds of sulfuric acid, 278 pounds of ammoniating solution and 858 pounds of urea. In order to maintain the amount of $P_2O_5$ at the desired level, it is necessary to add the sulfuric acid to help neutralize the ammonia and produce a nutrient solution having a pH in the range of 6.8 to 7. Four-hundred-ten pounds of No. 3 cobs and 170 pounds of potassium chloride are thoroughly mixed and the nutrient solution is sprayed onto the tumbling dry mixture. The product is then dried and screened and a solution of 40 pounds of the amine salt of 2,4-D is sprayed onto the product while it is being agitated. The final product contains 25 percent nitrogen, 10 percent $P_2O_5$, 5 percent $K_2O$ and 1.2 percent 2,4-D.

It is to be understood that, although the invention has been described with specific reference to particular embodiments thereof it is not to be so limited since changes and alterations therein may be made which are within the full intended scope of this invention, as defined by the appended claims.

What is claimed is:

1. The method of preparing a granular fertilizer composition characterized as being a dust-free, substantially uniform, non-friable, biochemically decomposable granular material, which comprises initially forming a reaction mixture by reacting appropriate amounts of phosphoric acid and an aqueous ammoniating solution to obtain said reaction mixture having a pH in the range of 6.8 to 7 and maintaining the temperature of the reaction mixture in the range of 150° to 200° F. by incremental additions of urea; forming a dry mixture of water insoluble, chemically inert ground corn cobs having a particle size of 12 mesh to 30 mesh, inclusive with about 25% of the particles being capable of passing through a size No. 20 sieve of the U.S. Sieve Series with the remaining 75% of the particles being retained on said No. 20 sieve, and a potassium salt selected from the group consisting of potassium chloride and potassium sulfate; adding the reaction mixture to the dry mixture while it is being agitated to form a product of substantially uniform composition; passing the product through a dryer maintained at a temperature such that the product is heated to a temperature in the neighborhood of 140° F. and excess moisture is removed and screening the product; said granular fertilizer containing 5 to 25% nitrogen, 3 to 14% phosphate as $P_2O_5$ and up to 10% potash as $K_2O$.

2. The method of claim 1 wherein urea-formaldehyde is added to the dry mixture.

3. The method of claim 1 wherein a pesticide, which is not sensitive to heat encountered in the dryer, is added to the reaction mixture after the reaction between the acid and ammoniating solution is completed.

4. The method of claim 1 wherein a pesticide is applied to the product after screening.

5. The method of claim 1 wherein the aqueous ammoniating solution is selected from the group consisting of ammonia, ammonia and ammonium nitrate, ammonia and urea, and ammonium nitrate and urea.

6. The method of preparing a granular plant food composition characterized as being a dust-free, substantially uniform, non-friable, biochemically decomposable granular material, which comprises initially forming a reaction mixture by reacting phosphoric acid and an aqueous ammoniating solution in proportions to obtain said reaction mixture having a pH in the range of 5.4 to 5.6 and maintaining the temperature of the reaction mixture in the range of 150° to 200° F. by incremental additions of urea; forming a dry mixture of water insoluble, chemically inert ground corn cobs having a particle size of 12 mesh to 30 mesh, inclusive with about 25% of the particles being capable of passing through a size No. 20 sieve of the U.S. Sieve Series with the remaining 75% of the particles being retained on said No. 20 sieve, potassium chloride and salts of trace elements selected from the group consisting of iron, copper, aluminum, zinc, calcium, and mixtures thereof, adding the reaction mixture to the dry mixture while it is being agitated to form a product of substantially uniform composition; passing the product through a dryer maintained at a temperature such that the product is heated to a temperature in the neighborhood of 140° F. and excess moisture is removed and screening the product; said granular plant food containing 5 to 25% nitrogen, 3 to 14% phosphates as $P_2O_5$, up to 10 potash as $K_2O$ and up to 3% trace elements.

7. The method of claim 6 wherein the aqueous ammoniating solution is selected from the group consisting of ammonia, ammonia and ammonium nitrate, ammonia and urea, and ammonium nitrate and urea.

References Cited by the Examiner

UNITED STATES PATENTS

| | | | |
|---|---|---|---|
| 879,877 | 2/1908 | Kennedy | 71—23 |
| 1,783,694 | 12/1930 | Blumanberg et al. | 71—23 |
| 1,944,788 | 1/1934 | Genz | 71—23 |
| 2,044,861 | 6/1936 | Sinden | 71—23 |
| 2,092,100 | 9/1937 | Waynick | 71—23 |
| 2,498,480 | 2/1950 | Bierlich et al. | 71—23 |
| 2,714,553 | 8/1955 | Bibb | 71—23 |
| 2,751,713 | 5/1956 | Abramitis | 71—1 |
| 2,974,030 | 3/1961 | Geary | 71—24 |
| 3,030,734 | 4/1962 | Brickey | 71—23 |
| 3,161,497 | 12/1964 | Amburn | 167—42 |

OTHER REFERENCES

Striplin, M. M., "High Analysis Liquid Fertilizer From Superphosphoric Acid," Agricultural & Food Chemistry, volume 7, No. 9, September 1959, p. 623.

DONALL H. SYLVESTER, *Primary Examiner.*

ANTHONY SCIAMANNA, *Examiner.*

T. D. KILEY, *Assistant Examiner.*